S. H. RANSOM.
Cooking Stove.
No. 29,312. Patented July 24, 1860.
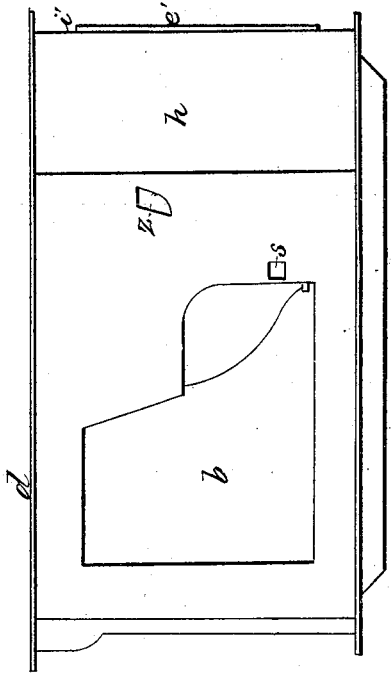
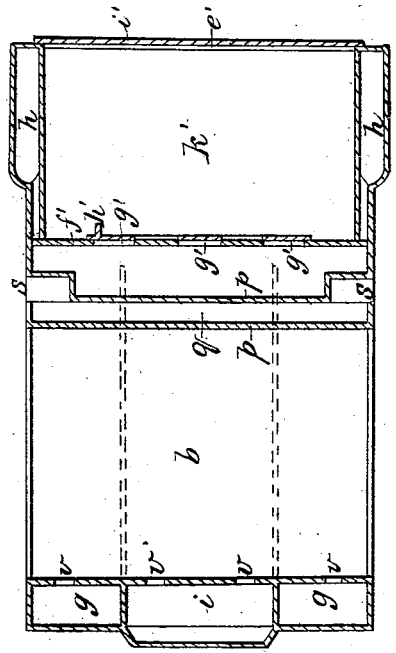
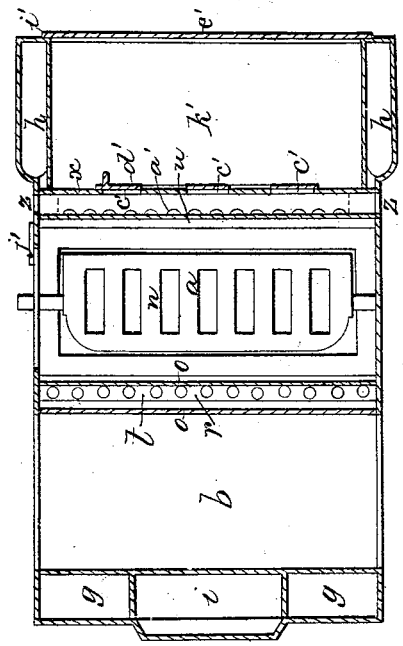
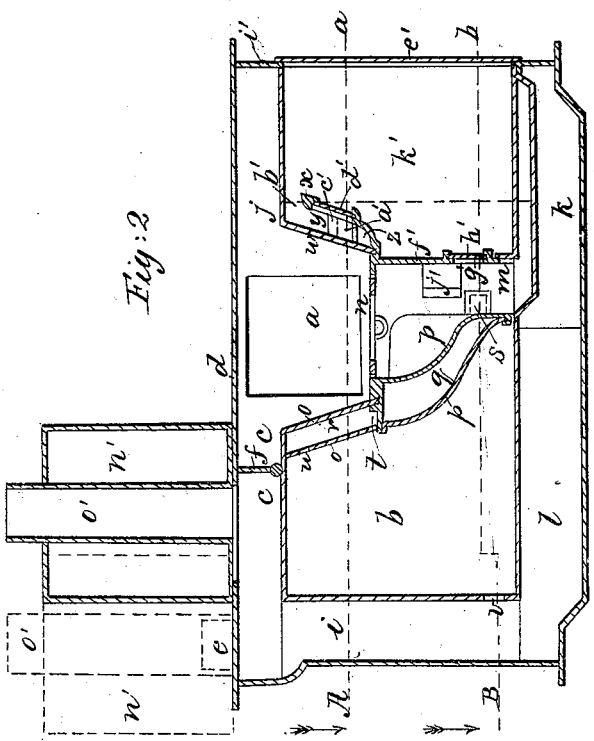
Witnesses.
Inventor.

UNITED STATES PATENT OFFICE.

S. H. RANSOM, OF ALBANY, NEW YORK.

STOVE.

Specification of Letters Patent No. 29,312, dated July 24, 1860.

*To all whom it may concern:*

Be it known that I, S. H. RANSOM, of Albany, in the State of New York, have invented new and useful Improvements in Cooking-Stoves; and I do hereby declare that the following is a full, clear, and exact description thereof, reference being had to the accompanying drawings, making part of this specification, in which—

Figure 1, is a side elevation; Fig. 2, a longitudinal vertical section; and Figs. 3 and 4, horizontal sections taken in the planes of the lines A, *a*, and B, *b*, of Fig. 2.

The same letters indicate like parts in all the figures.

My said invention relates to improvements in cooking stoves with the view to increase their capacity and efficiency. The first part of my said invention consists in forming an inclosed roasting or baking chamber in front of the fire chamber and over the usual fire hearth by extending the top and sides as far forward as the usual hearth plate, and combining therewith a front plate provided with doors to give access to such chamber. And my said invention also consists in combining with such extension roasting or baking chamber the forming a flue space over the top and under the bottom thereof, and diving flues at the sides so that the products of combustion from the fire chamber shall pass over the top, down the sides, and under the bottom of such roasting chamber, and thence back to the escape flue, when this is combined with the main oven at the back of the fire chamber provided with diving and return flues, whereby the products of combustion from the fire chamber are made to separate and pass forward and down to heat the roasting chamber, and also back and down and under the bottom to heat the main oven, and all unite and pass into the return flue at bottom, and thence to the rising flue at back, which leads to the chimney. By this combination and without occupying more area in the kitchen than is occupied by the ordinary cooking stove I am enabled to obtain a chamber which is rendered more effective for roasting than with the ordinary tin kitchen on a stove with an open hearth, for the heat instead of being radiated into the room is all confined within this chamber which by reason of being thus heated may be used as an auxiliary oven for baking &c. And my said invention also consists in combining with such inclosed roasting chamber a double front to the fire chamber, with an air chamber between which receives air from the room and discharges it into the roasting chamber from which it escapes through suitable apertures to the ash pit to support combustion in the fire chamber. By these means I am enabled to roast more effectually and economically than by the usual tin kitchen placed on the open hearth, while at the same time I obtain a more perfect circulation of air around the meat that is being roasted and without which roasted meat will be injured by partaking a baked flavor due to the retention of the gases evolved. And this part of my invention also consists in making the outer of the double plates interposed between the fire chamber and the roasting chamber with apertures governed by a damper or register to regulate the heat for roasting, for when the said apertures are opened the heat will be radiated through a single plate onto the articles being roasted, and when closed it will have to pass through two plates with an air chamber interposed. This will not only be advantageous in roasting but it will render the said chamber useful for baking and other culinary purposes. As the extension of the top to form the baking chamber greatly enlarges the area of this plate I am enabled thereby to obtain a more efficient hot water boiler than can be obtained with cooking stoves as heretofore constructed.

In the accompanying drawings ($a$) represents the fire chamber, which is elevated and extends in part over the main oven ($b$) in manner well known to stove manufacturers. For the purpose of kindling the fire there is a flue ($c$) running directly back from the fire chamber between the oven top and boiler plate ($d$) to the exit pipe ($e$). This flue is provided with the usual damper ($f$) which when closed diverts and directs the draft to, and down, four diving flues ($g, g$) and ($h, h$). The two diving flues ($g, g$) are at the back of the oven ($b$) and one on each side of the middle rising flue ($i$) which discharges in the exit pipe; and the other two ($h, h$) are at the sides of the front extension ($i'$) which forms a roasting chamber or oven in front of the fire chamber, the top of the said front extension being heated by a portion of the products of combustion passing directly from the fire chamber in a flue space ($j$) between the top plate of this chamber and the boiler plate, and thence down the two side flues ($h, h$) to a flue space ($k$) between the bottom or hearth plate of this extension and the bottom plate of the stove.

The products of combustion which pass down the two rear flues ($g, g$) then pass forward under the oven bottom through the usual side flues (shown by dotted lines in Fig. 4,) toward the front, and thence in the middle return flue ($l$) between the two side flues back to the middle rising flue ($i$) at the back. The flue space ($k$) under the front extension ($i'$) also discharges in this return flue ($l$).

The fire chamber ($a$) is provided with an ash pit ($m$) below the grate ($n$), and the back plate ($o$) of the fire chamber, and the back plate ($p$) of the ash pit together form the front of the main oven ($b$) but both of these plates are double with hot air chambers ($q, r$) between to prevent the overheating of the front end of the oven.

Atmospheric air is admitted to the lower hot-air chamber ($q$) through apertures ($s, s$) in the side plates of the stove, and being therein heated rises by rarefaction into the upper of the said chambers ($r$) through apertures in the horizontal plate ($t$) which divides these two chambers, and the air being still further heated in the chamber ($r$) escapes into the oven ($b$) through apertures ($u$) near the top of the front plate of the said oven and after circulating through the oven escapes into the back flues through apertures ($v$) in the back oven plate.

The front of the fire chamber ($a$) is formed of two plates ($w, x$) with a hot air chamber ($y$) between them which is supplied with air from the room through apertures ($z, z$) in the side plates. There is a horizontal flanch or partition ($a'$) in the said air chamber and at such distance above the bottom that the air shall enter the said chamber below the said flanch ($a'$) and either the rear edge of the said partition is formed with a series of notches as shown in Fig. (3) or the front plate ($w$) of the fire chamber in contact with the said flanch is to be corrugated or fluted, to form a series of small apertures the better to distribute the air as it enters and passes through the said chamber ($y$). The air in passing through this chamber ($y$) escapes through a narrow space ($b'$) between the upper edge of the plate ($z$) and the top plate of the front extension roasting or heating chamber in front. And this plate ($x$) is provided with a series of large apertures ($c'$) controlled by a sliding damper ($d'$) so that for the purpose of roasting which is done in front of this plate, these apertures may be either opened or closed, and when opened the heat from the fire chamber will be radiated through one plate only, and when closed through two plates with an air chamber interposed. In this way the heat for roasting can be regulated at pleasure.

The front extension ($i'$) is formed on what is the usual hearth plate. It is inclosed at the sides and top and bottom and heated as before specified and provided with doors ($e'$) in front. The lower part of this roasting chamber is separated from the ash pit by a vertical plate ($f'$) provided with apertures ($g'$) governed by a sliding or other suitable damper ($h'$), and this ash pit has another damper ($j'$) in the side plate or plates which when open admits air from the room to supply the draft to the fire; but when this is closed and the damper ($h'$) is open then the air admitted to the air chamber ($y$) after passing into the roasting chamber ($k'$) and circulating therein escapes into the ash pit through the apertures ($g'$) to supply the draft to the fire. In this way and by this extension which occupies no more space in a kitchen a chamber is formed principally for the purpose of roasting, but which may conveniently be used as an oven, and in which the heat is confined, while at the same time a constant circulation of heated air is carried through it and in such direction as to pass in contact with any article which is being roasted to avoid those bad odors which otherwise would be imparted.

The top or boiler plate ($d$) extends over the said extension or roasting chamber ($k'$) adding, if desired, two more boiler holes without occupying more space than in ordinary stoves as heretofore constructed.

The water boiler ($n'$) can be placed, if desired, in the usual position over the flue leading to the exit pipe, as represented by dotted lines, but as the boiler plate is greatly enlarged by reason of the extension or roasting chamber, I prefer to place the boiler as represented by full lines just over what are usually the two rear boiler holes, so that the bottom of the boiler at both sides will be heated by the passage of the heated products of combustion in their direct passage from the fire chamber to the back diving flues; and by carrying the exit pipe ($o'$) through the center of the said boiler the middle portion of the said boiler will be heated by the escaping products of combustion, while at the same time by placing the boiler so much more forward under this arrangement the middle flue space over the oven heretofore only employed while firing up, is thus constituted a return flue which causes the products of combustion to pass in part over the central portions of the top of the oven to equalize the heat thereof.

Having thus pointed out the characteristic features of my invention and the specific mode of construction adopted by me, I wish it to be distinctly understood that I do not confine myself to such mode of construction as that may be greatly modified without changing the features which I have pointed out as constituting my said invention.

What I claim as my invention, and desire to secure by Letters Patent, is—

1. Combining with the fire chamber, and the usual oven at the back thereof, an inclosed roasting chamber in front of the fire chamber and over what is the usual fire hearth, by extending the top and sides as far forward as the usual hearth plate, and inclosing the front, all substantially as and for the purposes specified.

2. In combination with the inclosed roasting chamber, and with the main oven back of the fire chamber, and with the flues to heat the same, the forming flue spaces over the top and under the bottom connected by diving flues at the sides, substantially as and for the purposes specified.

3. The arrangement of the air chamber to which air is supplied from the room which is interposed between the fire chamber and the inclosed roasting chamber over the fire hearth in combination with a horizontal perforated partition in the said air chamber and above the apertures for the admission of air that the air to be heated may be distributed along the whole length of the said air chamber, so that when heated it shall escape from the upper part thereof in a sheet into the roasting chamber and thence pass down and thence to the ash pit to supply combustion, as described.

4. In combination with the inclosed roasting chamber and double plates interposed between them the making of one of the said plates with apertures governed by a damper or register to regulate the heat for roasting, substantially as specified.

S. H. RANSOM.

Wtinesess:
W. H. BISHOP,
PETER DE LACY.